United States Patent [19]

Girieud

[11] Patent Number: 5,032,346
[45] Date of Patent: Jul. 16, 1991

[54] METHOD OF DETERMINING AND EVALUATING THE EMERGENCY SHUTDOWN MARGIN FOR A PRESSURIZED WATER NUCLEAR REACTOR

[75] Inventor: Patrick Girieud, Clamart, France

[73] Assignee: Framatome, Courbevoie, France

[21] Appl. No.: 333,409

[22] Filed: Apr. 5, 1989

[30] Foreign Application Priority Data

Apr. 5, 1988 [FR] France .............................. 88 04439

[51] Int. Cl.$^5$ .............................................. G21C 7/36
[52] U.S. Cl. .................................... 376/216; 376/217; 376/219
[58] Field of Search ...................... 376/216, 217, 219; 364/550, 556

[56] References Cited

U.S. PATENT DOCUMENTS

| | | | |
|---|---|---|---|
| 4,075,059 | 2/1978 | Bruno | 376/216 |
| 4,470,949 | 9/1984 | Deroubaix | 376/217 |
| 4,711,753 | 12/1987 | Impink, Jr. | 376/216 |

FOREIGN PATENT DOCUMENTS 0238299  7/1982  European Pat. Off. .

*Primary Examiner*—Donald P. Walsh
*Attorney, Agent, or Firm*—Pollock, Vande Sande & Priddy

[57] ABSTRACT

The emergency shutdown margin is determined and evaluated by calculating a shutdown margin with the general formula $$Mar = \Delta Pg + \Delta Pp - \Delta Pr,$$

where Mar is the shutdown margin being sought, $\Delta Pg$ is the negative reactivity attributed to the full set of the reactor's control rods when that set moves from withdrawn to fully inserted position, $\Delta Pp$ is the reactivity brought about by the change from nominal power to zero power and $\Delta Pr$ is the negative reactivity already consumed to bring the reactor into the situation it is in at the instant under consideration and is calculated from the negative reactivity derived from the measured position of the power control clusters (20), taking into account the axial power distribution as measured (C1 to C6) and the depletion of the core as defined in advance, from a term evaluating the reactivity contributed by the drop in power from nominal power to the current situation of the reactor and from a scale constant.

7 Claims, 1 Drawing Sheet

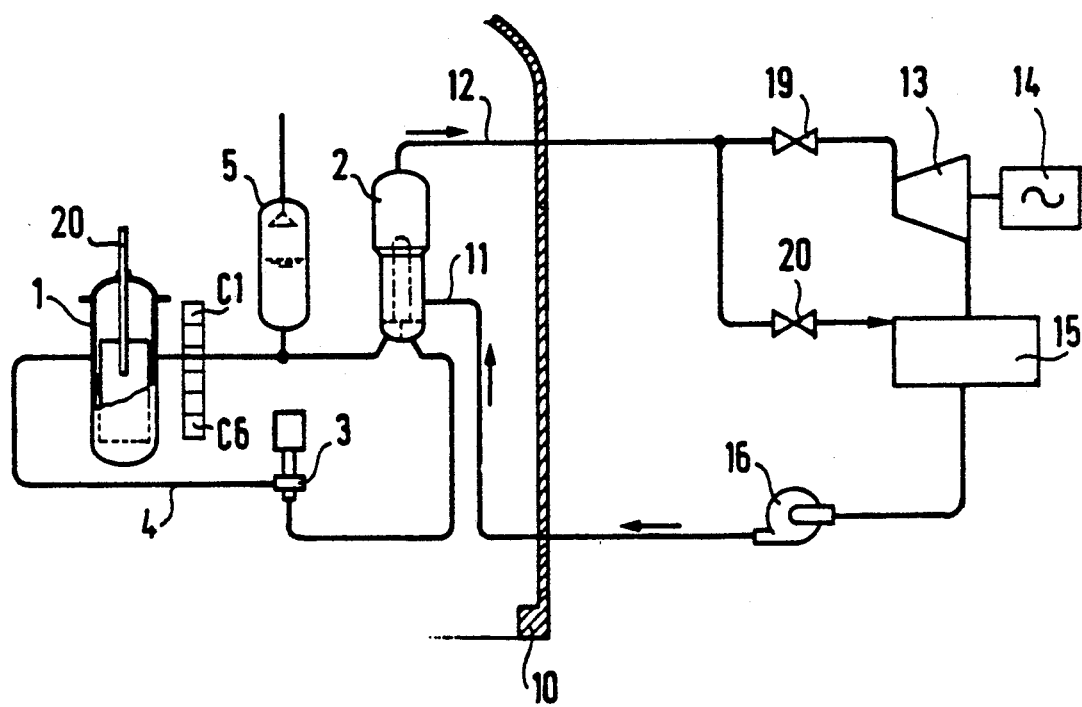

METHOD OF DETERMINING AND EVALUATING THE EMERGENCY SHUTDOWN MARGIN FOR A PRESSURIZED WATER NUCLEAR REACTOR

This invention concerns the operation and control of pressurized water nuclear electric plants and, more specifically, the determination and evaluation of the emergency shutdown margin of the reactor of such a power plant. More exactly, it aims to provide an evaluation of the emergency shutdown margin which preventively takes into account accidental loss of steam from the secondary circuit.

Pressurized water reactors (PWR) are well known. Briefly, they comprise a reactor, containing, in a vessel thereof, fuel assemblies consisting of fuel rods containing the fissionable material; in some such reactors, movable control rods are inserted, containing a material that absorbs neutrons. The control rods of a fuel assembly, operated together, form a control cluster. The fuel assemblies are immersed in the water under pressure that circulates in a primary circuit having several primary loops, each including a primary pump and a steam generator. One of these loops also comprises a pressurizer which maintains the water pressure in the reactor. The pressurized water serves as a moderating and heat transfer fluid. Moreover, it contains boron in solution, a neutron-absorbing material serving, as the control clusters, for regulating reactor operation.

The steam generators supply steam to a secondary circuit essentially comprising a turbine driving an alternator, a condenser and some pumps.

The reactivity is a measure of changes in the chain reaction in the reactor's core. In this chain reaction, the neutrons produced by the fission of heavy nuclei, slowed by the moderator—the water under pressure of the primary circuit—and absorbed to a greater or lesser extent by the control rods and the dissolved boron, come in their turn to produce further fissions. The factor, called k, by which the number of fissions comes to be multiplied from one generation to the next is generally equal to 1. It may temporarily be greater than 1. Reactivity refers to the positive difference between k and 1. It is counted in parts per hundred thousand. In the presence of a non-zero reactivity, the chain reaction tends to increase. At other times, the k factor can be less than 1; the reactivity is negative and is then said to be in "deficit". In this case, the reaction tends to be smothered.

The power of the reactor is adjusted by acting on the reactivity, in fact by acting upon the position of the control rods and/or upon the concentration of boron. To increase the power, a positive reactivity is induced. The reaction increases. The temperature rises in the reactor and the density of the water in the primary circuit decreases. Its moderating effect diminishes, which is the equivalent of an addition of negative reactivity, which negative reactivity finally balances the reactivity. The reactor then stabilizes at a higher level of power. To reduce the power, the reverse process must be performed.

The reactor can thus provide the thermal power required of it, generally to meet the electricity needs of the power grid to which the generating plant is connected.

Among the considerations which govern the choice between the two modes of regulating a nuclear reactor, either by control rods or by boron level, it should first be mentioned that while action on the control rods has immediate effects, action by means of dissolved boron is comparatively slower.

Moreover, increasing the concentration of boron in solution requires means for storing and injecting boric acid, whereas decreasing the boron concentration requires means for dilution and, above all, for treatment and storage of the effluents, means which are all the larger and costly for the fact that one will have recourse more often and for longer periods to action by dissolved boron.

Dissolved boron therefore tends to be used only to correct long-term effects on reactivity of reactor operation, meaning essentially the xenon effect and the ageing of the fuel.

Regulation of the thermal power supplied by the reactor to meet the needs of the electricity grid is thus preferably effected by control rods. However, insertion of the control rods adversely affects the axial distribution of the power produced in the reactor. This results in temperature inequalities within the reactor core, accompanied, in particular, by accelerated depletion of the fuel in the hottest places and by localized production of xenon, factors playing a restrictive role in the reactor control process and requiring a correlative recourse to action upon the level of dissolved boron.

The growth of nuclear power plants' share of overall electricity production has made it necessary for nuclear plants, initially utilized as base load plants with a near-constant output, to be employed for load following, with a generating level closely following a day curve, and even in remote-controlled mode, with the generating level conforming to an arbitrary curve, thus multiplying the required control actions, with the adverse consequences mentioned above. Those skilled in the art have therefore sought control-rod-based regulating methods in which the distortion of the axial distribution of power would be less and its adverse effects limited.

One instance is described in French patent No. 2,395,572, whereby a nuclear plant operating and control method is provided in which, to control the reactivity effects due to power variations, one moves, solely as a function of the power demanded from the turbine, groups made up of clusters of absorbing material at least one of which has low negative reactivity, to vary the output of the reactor, as well as a group, termed the R group, made up of very absorbent clusters, according to the difference existing at each instant between the average temperature of the reactor core and a reference temperature which is a function of the power level demanded, the action on the concentration of the boron in solution serving to maintain the R group in a certain range, in addition to correcting the long-term reactivity effects.

Subsequently, in French patent No. 2,493,582, a nuclear reactor operating and control method was described in which control is obtained by coordinated movement in the core of the reactor, of control rod groups such that disturbances to the axial distribution of power are always limited. This avoids having to rely on dissolved boron, the boron concentration then being adjusted only so as to compensate the effects of xenon release and of ageing of fuel rods.

Although the latter system provides undeniable advantages in the course of normal reactor operation, it nevertheless presents one drawback in terms of safety, when one takes into account the risk of accidental rupture of the secondary circuit.

In such a situation, the secondary circuit is suddenly cooled, and likewise the primary circuits and the reactor core. The safety devices trip and bring about full insertion of all the control clusters and a safety injection of boron. This is normally followed by shutdown of the reactor.

However, in the two above-described operating and control methods, when this occurs, the level of boron solution can be relatively low, whereas the insertion of control rods can be relatively substantial. Full insertion of the control rods provides sufficient negative reactivity to halt the release of thermal power in the reactor. This effect, combined with the cooling of the primary circuit caused by the rupture of the secondary circuit, brings about a substantial drop in the temperature of the water in the reactor core, and accordingly an increase in its effectiveness as a moderator and a corresponding addition of reactivity. Since the effect of the safety injection of boron is not immediate, this addition of reactivity could overcome the negative reactivity provided by the full insertion of the control rods and the reaction would resume, temporarily, and possibly lead to a brief, unacceptable elevation of the fuel elements' temperature.

This difficulty has been perceived and overcome by a method of determining and evaluating the emergency shutdown margin, in other words the negative reactivity available for an emergency shutdown, relative to that required specifically for a rupture in the secondary circuit, with the goal of bringing about corrective actions, if it is sufficient.

This method, defined more specifically in relation with the nuclear reactor operating and control method of French patent No. 2,395,572, basically consists in monitoring the negative reactivity which the R group can provide at any time. Indeed, the contribution of the power control clusters may be deemed to be null until the time they have been completely inserted. Although they do provide some negative reactivity, the corresponding drop in temperature of the moderator provides a positive reactivity of equal worth. The contribution of the safety rods in this respect is known. Only the clusters of the R group are in a continuously variable position, which does not depend on the temperature; their position is thus the only parameter to be monitored. It should be added that the evaluation must take into account, from the safety standpoint, all the inaccuracies of the control system, especially as concerns the negative reactivity effect of the power control rods. The required negative reactivity is accordingly augmented by a safety term of constant value, defined by approximation, to cover the worst case conditions. Moreover, the negative reactivity which the temperature control rods can provide is only an estimated value, derived from the position of the rods and from a relation between the position of the rods and negative reactivity, in the worst case from the safety standpoint.

Such a method can no longer be applied in the case of the operating and control method according to French patent No. 2,493,582. In fact, the distinction between power control groups and temperature control group R is lost there. The position of the power control groups is continuously variable according to a complex program. There is no longer just one parameter to be monitored but several and the issue is no longer solely the position of groups of control rods.

SUMMARY OF THE INVENTION

The object of this invention is therefore a method of determining the emergency shutdown margin in pressurized water reactors that suits the secondly mentioned operating and control method and even, more generally, all operating and control methods.

Moreover, as already mentioned, the method for determining the emergency shutdown margin applied hereto involves an approximation of unmeasured influences, in the form of a safety term which increases the required negative reactivity and another approximation with respect to the negative reactivity which the temperature regulating rods may provide at any time. This often results in undue restrictions on reactor regulation.

Another object of the invention is a method of determining the emergency shutdown margin that does not suffer from such restrictions.

The method of determining and evaluating the emergency shutdown margin for a pressurized water nuclear reactor, according to the invention, consists in calculating a shutdown margin by application of the general formula $$Mar = \Delta Pg + \Delta Pp - \Delta Pr,$$

in which Mar is the shutdown margin being sought, $\Delta Pg$ is the negative reactivity (negatively signed) attributed to the full set of the reactor's control rods when that set moves from withdrawn to fully inserted position, $\Delta Pp$ is the reactivity (positively signed) brought about by the change from nominal power to zero power and $\Delta Pr$ is the negative reactivity already consumed to bring the reactor into the situation it is in at the instant under consideration and is calculated by applying the following formula:

$$\Delta Pr = EG + DC + EGo,$$

where EG is the negative reactivity stemming from the position, as measured, of the power control clusters, allowing for the axial distribution of power as measured and the previously defined depletion of the core, DC is a term evaluating the reactivity contributed by the drop in power from nominal power to the current situation of the reactor, EGo containing a scale constant.

The term DC can be a sum including one or more of the following terms:

a first term DP corresponding to the reactivity effect of the reduction of power in relation to nominal power, which is a function of the first degree of the measured distortion in axial power, a first corrective term FP corresponding to the reactivity effect of the error at the actual power, as measured, caused by the distortion of the distribution of the density of the water in the reactor core, which is a function of the second degree of the measured axial power distortion, a second corrective term FT corresponding to the reactivity effect of the difference between the core's average temperature, which is a measured quantity, and the set-point temperature, which is a set quantity.

The method according to the invention is also directed to determining the difference between the emergency shutdown margin so calculated and a minimum margin calculated once and for all for the given reactor and taken as a constant, itself included in the constant EGo.

The inventive method also provides for the use of the latter difference to bring about a corrective action consisting in modifying the level of dissolved boron in the primary circuit.

DESCRIPTION OF THE FIGURE

FIG. 1 illustrates a pressurized water nuclear plant employing an embodiment of the present invention.

DESCRIPTION OF THE PREFERRED EMBODIMENT

The various objects and characteristics of the invention will now be explained in greater detail in the following description of a specific embodiment thereof, taken with reference to the appended drawing showing very schematically a pressurized water nuclear plant.

In FIG. 1, the core of a pressurized water reactor is represented in 1, associated, in a primary circuit 4, with a steam generator 2. The water under pressure is forced to move by a primary pump 3. A pressurizer 5 maintains the volume and pressure of the water in the primary circuit. These different elements are arranged in an enclosure 10 traversed by the pipes of a secondary circuit 12 connected to the steam generator 2. The secondary circuit 12 includes a turbine 13, driving an alternator 14, a condenser 15 and a secondary pump 16. Valves 19 and 20 allow the turbine 13 to be by-passed to maintain the secondary circuit in the event the alternator drive must be interrupted.

As previously indicated, the reactor core contains, in a vessel thereof, fuel assemblies consisting of fuel rods containing the fissile material; in some of them are inserted movable control rods 20 containing a neutron-absorbing material. The control rods of a fuel assembly, operated together, form a control cluster. The fuel assemblies are immersed in the water under pressure which flows in the primary circuit 4, said circuit 4 in fact being comprised of a plurality of primary loops only one of which—that represented in the figure—includes the pressurizer 5. The water under pressure serves as both moderating fluid and coolant. Moreover, it contains boron in solution, a neutron absorbing material serving, as the control clusters, for regulating reactor operation.

The circuits for injecting boron, in the form of boric acid, into the primary circuit 4 have been omitted from the drawing.

The figure also shows ionization chambers C1 through C6, arranged near the reactor, outside the reactor vessel, for measuring the neutron flux at different levels of height. In practice these detectors consist of four individual detectors per level, whose output signals are combined so that each supplies a signal representative of the instantaneous power output by the reactor at the corresponding level.

Other devices for measuring and determining diverse variables, such as the temperature in various parts of the primary circuit, the depth of insertion of the control rods and the boron content of the water under pressure in the primary circuit, have been omitted from the drawing.

Finally, in a well known manner, the state of the reactor core is periodically redefined, by putting the reactor in set operating conditions and making specific measurements, some of which use probes introduced into the core for the purpose.

In operation, the actual power of the reactor is expressed in relative terms, as a fraction of the nominal power (rated output), in other words of the maximum power at which the reactor is designed to operate, for which the insertion of control rods is minimal. The actual power, denoted by $P_{rel}$, is measured, for example on the basis of the neutron fluences indicated by detectors C1 to C6. The axial power distortion, in other words a value characterizing the asymmetry of the distribution of the actual power, will also be derived from the output signals from these sensors. The position of the control rods is directly indicated by cluster insertion step counters. A reference temperature $T_{ref}$ is defined according to the output demanded of the reactor. An average temperature of the core $T_{av}$ is derived from the temperatures measured in the primary circuit, at the pressurized water inlet to the reactor and the pressurized water outlet from the reactor.

The invention concerns a method of determining and evaluating the emergency shutdown margin for such a reactor, in a normal operating situation, which can preventively take into account loss of steam from the secondary circuit 12.

In such a situation, the automatic safety systems, tripped by abnormal excursions of the pressure and temperature values, cause the complete insertion of all the control rods. However, for safety, one should anticipate that one of the clusters might not achieve insertion. At the same time, a safety injection of boron occurs with the certain effect of halting the reaction.

The problem is that the effect of the boron injection command is not immediate and that the negative reactivity provided by the control rods' insertion must be sufficient to offset at least the reactivity provided by the cooling of the water in the primary circuit pursuant to the escape of steam from the secondary circuit. This reactivity of accidental origin can be defined by calculation. One should therefore ensure that the potential negative reactivity of the control clusters remains sufficient at all times to meet this need. To this end, it must be determined and evaluated.

In accordance with the invention, an emergency shutdown margin is calculated by applying the general formula $$Mar = \Delta Pg + \Delta Pp - \Delta Pr,$$

in which Mar is the (negative) shutdown margin being sought, $\Delta Pg$ is the negative reactivity attributed to the full set of the reactor's control rods when that set moves from withdrawn to fully inserted position, $\Delta Pp$ is the (positive) reactivity brought about by the change from nominal (rated) power to zero power and $\Delta Pr$ is the negative reactivity already consumed to bring the reactor into the situation it is in at the instant under consideration and is calculated by applying the following formula:

$$\Delta Pr = EG + DC + EGo,$$

where EG is the negative reactivity stemming from the position; as measured, of the power control clusters, allowing for the axial distribution of power as measured and the previously defined depletion of the core, DC is a term evaluating the reactivity contributed by the drop in power from nominal (rated) power to the current situation of the reactor, EGo containing a scale constant.

We will now review the different terms of the above-stated formulas from the standpoint of how they are developed.

ΔPg, the total negative reactivity of the control rods, including the power control clusters and the emergency shutdown (scram) clusters, is a characteristic of the reactor determined in advance, in which it will be assumed for safety purposes that one cluster of maximum negative reactivity fails to be inserted.

ΔPp, the total reactivity due to the cooling of the water under pressure to the temperature which corresponds to the stopping of the chain reaction, is also a characteristic of the reactor determined in advance.

ΔPr, the negative reactivity consumed by the inserted control rods, consequently depends on the actual conditions of reactor operation.

EGo is a constant.

The terms ΔPg, ΔPp and EGo being set constants in accordance with the characteristics of the reactor, the method according to the invention provides only for determining on line ΔPr and an example will now be given of the way its various component parts are determined.

The term EG corresponds to the negative reactivity consumed by insertion of the rods and is determined on the basis of the power measure signals from the neutron flux detectors and the insertion levels of the power control clusters.

According to one embodiment of the invention, the term EG results from the application of the following formula, in matrix notation:

$$EG = \frac{[Pref] \, [A] \, [Pr]}{[Pref] \, [Pr]}$$

where [Pref] and [Pr] are vectors representing an axial power distribution, the first periodically redefined in a reference configuration in order to represent the axial depletion of the core, whereas the second derives from on line measurements made by the neutron flux detectors.

One and the other are determined by applying a formula of the following type:

$$[P] = [T]^{-1} [S]^{-1} \qquad [1]$$

where [P] is the axial power distribution, [T] is a transfer matrix of the measuring system, [S] is a sensitivity matrix of the detectors and [1] stands for the outputs from the neutron detectors.

The term [A] is a diagonal matrix representing the negative reactivity contributed by the power control clusters and it is the sum of as many terms $$[A] = C_1 [G_1]$$

as there are power control groups, $C_1$ standing for the integral effectiveness of the group, either determined or previously measured, and $[G_1]$ being a position matrix whose terms are directly defined by the position of the control group indicated by its insertion step counter.

The inventive method further provides for evaluating the addition of reactivity due to the difference in power between the nominal power (rated output) and the current situation of the reactor, in the form of a term DC. To estimate as accurately as possible the value of reactivity already consumed, the invention constitutes this term as a sum comprising one or more of the terms DP, FP, FT defined hereinafter.

The first term, DP, corresponds to the reactivity effect of the reduction in power from nominal power, which is a function of the first degree of the measured axial power distortion, based on the formula $$DP = (p1 + p2.Ao)(1 - Prel)$$

where p1 and p2 are constant dimensioning coefficients, Prel has been previously defined herein and Ao is the axial power distortion computed by using the formula $$Ao = \frac{Ph - Pb}{Ph + Pb},$$

Ph and Pb being respectively the powers in the upper part and the lower part of the core, derived from measurements made on line by the neutron detectors.

The first corrective term, FP, corresponds to the reactivity effect at actual measured power of the distortion in the distribution of the density of the water in the core of the reactor, which is a function of the second degree of the measured axial power distortion, according to the formula $$FP = Prel(p3 + p4.Ao + p5.Ao^2),$$

p3, p4 and p5 being again constant dimensioning coefficients.

The second corrective term, FT, corresponds to the reactivity effect of the difference between the average temperature of the core, which is a measured variable, and the setpoint temperature, which is a preset quantity, according to the formula $$FT = p6(Tav - Tref),$$

p6 being a new constant coefficient and Tav being the average temperature of the reactor core obtained from the primary circuit temperatures at the inlet and outlet of the core.

Following these corrections, the determination of the potential negative reactivity of the control rods is highly accurate, such that the term EGo can be a simple scale constant. This constant can nevertheless include a minimum margin computed once and for all for the given reactor and also assumed to be constant, namely that margin allowing for the consequences of a rupture in the secondary circuit. In this case, then, evaluating the set margin is simple: it need only be greater than zero.

The invention also provides for using the emergency shutdown margin so determined and evaluated for tripping, by any available means, a corrective action consisting in raising the level of boron in solution in the primary circuit.

The descriptions given hereinbefore of examples of an embodiment of the invention and some of its variations should not be construed as limiting the scope of the invention as defined by the following claims.

What is claimed is:

1. A method for providing an emergency shutdown margin for a pressurized water nuclear reactor comprising:

measuring at various axial levels of said nuclear reactor neutron flux produced from various levels of said nuclear reactor;

measuring the position of power clusters of said nuclear reactor;

determining the axial power distribution of said nuclear reactor based upon said measured neutron flux;

determining for said nuclear reactor the negative reactivity ΔPG which results from said nuclear reactor control rods being moved from a fully withdrawn to fully inserted position in said nuclear reactor;

determining for said nuclear reactor the reactivity ΔPP which results when said nuclear reactor changes from a nominal power condition to a present operating condition;

determining for said present operating condition the negative reactivity ΔPR assumed when said nuclear reactor is brought from full power to said present operating condition including the steps of:

determining the negative reactivity EG from the position of said power clusters, and the axial distribution of power, and the depletion of said nuclear reactor core;

determining from said measured neutron flux the reactivity DC contributed by the drop in power from nominal power to the current operating power level of said nuclear reactor;

combining said negative reactivity EG with said reactivity DC and a constant to derive said negative reactivity ΔPR consumed to bring said nuclear reactor from a full power condition to said present operating condition; and, calculating a safety margin by combining said negative reactivity ΔPG, said reactivity PP, and said negative reactivity as:

ΔPG+ΔPP−ΔPR.

2. Method of determining and evaluating the emergency shutdown margin according to claim 1, wherein said reactive core average temperature is measured, and the reactivity DC is a sum comprising one or more terms as follows:

a first term DP corresponding to the reactivity effect of the reduction of power in relation to nominal power, which is a function of the first degree of the measured distortion in axial power as determined from said neutron flux-measurements;

a first corrective term FP corresponding to the reactivity effect of the error in the actual measured power of said reactor, caused by the distortion of the distribution of the density of the water in the reactor core, which is a function of the second degree of the measured axial power distortion as determined from said neutron flux measurements;

a second corrective term FT corresponding to the reactivity effect of the difference between the core's average temperature, which is a measured quantity, and the setpoint temperature, which is a set quantity.

3. Method according to claim 2, wherein the first term DP corresponds to the reactivity effect of the reduction in power from nominal power, which is a function of the first degree of the measured axial power distortion, based on the formula $$DP=(p1+p2.Ao)(1-Prel)$$

where p1 and p2 are constant dimensioning coefficients, Prel is the relative power supplied by the core, determined by on-line measurement of the neutron flux emitted by the reactor core, and Ao is the axial power distortion computed by using the formula $$Ao = \frac{Ph - Pb}{Ph + Pb},$$

Ph and Pb being the powers in the upper part and the lower part of the core respectively, derived from the on-line measurements of the neutron fluences.

4. Method according to claim 2, wherein the first corrective term, FP, corresponds to the reactivity effect of the deviation from the actual power, as measured, caused by the distortion of the distribution of the density of the water in the core of the reactor, which is a function of the second degree of the measured axial power distortion, according to the formula $$FP=Prel(p3+p4.Ao+p5.Ao^2),$$

p3, p4 and p5 being constant dimensioning coefficients.

5. Method according to claim 2, wherein the second corrective term, FT, corresponds to the reactivity effect of the difference between the average temperature of the core, which is a measured variable, and the setpoint temperature, which is a preset quantity, according to the formula $$FT=p6(Tav-Tref),$$

p6 being a constant coefficient and Tav being the average temperature of the reactor core obtained from the primary circuit temperatures at the inlet and outlet of the core.

6. Method according to any of claims 2 through 5, wherein the emergency shutdown margin expresses the difference with respect to a minimum margin which is included in the constant EGo.

7. Method according to any of the claims 2 through 6, further comprising triggering a corrective action by changing the level of boron in solution in the primary circuit of said nuclear reactor.

* * * * *